Nov. 23, 1954     W. C. COULBOURN ET AL     2,694,927
MACH NUMBER METER
Filed Feb. 6, 1953
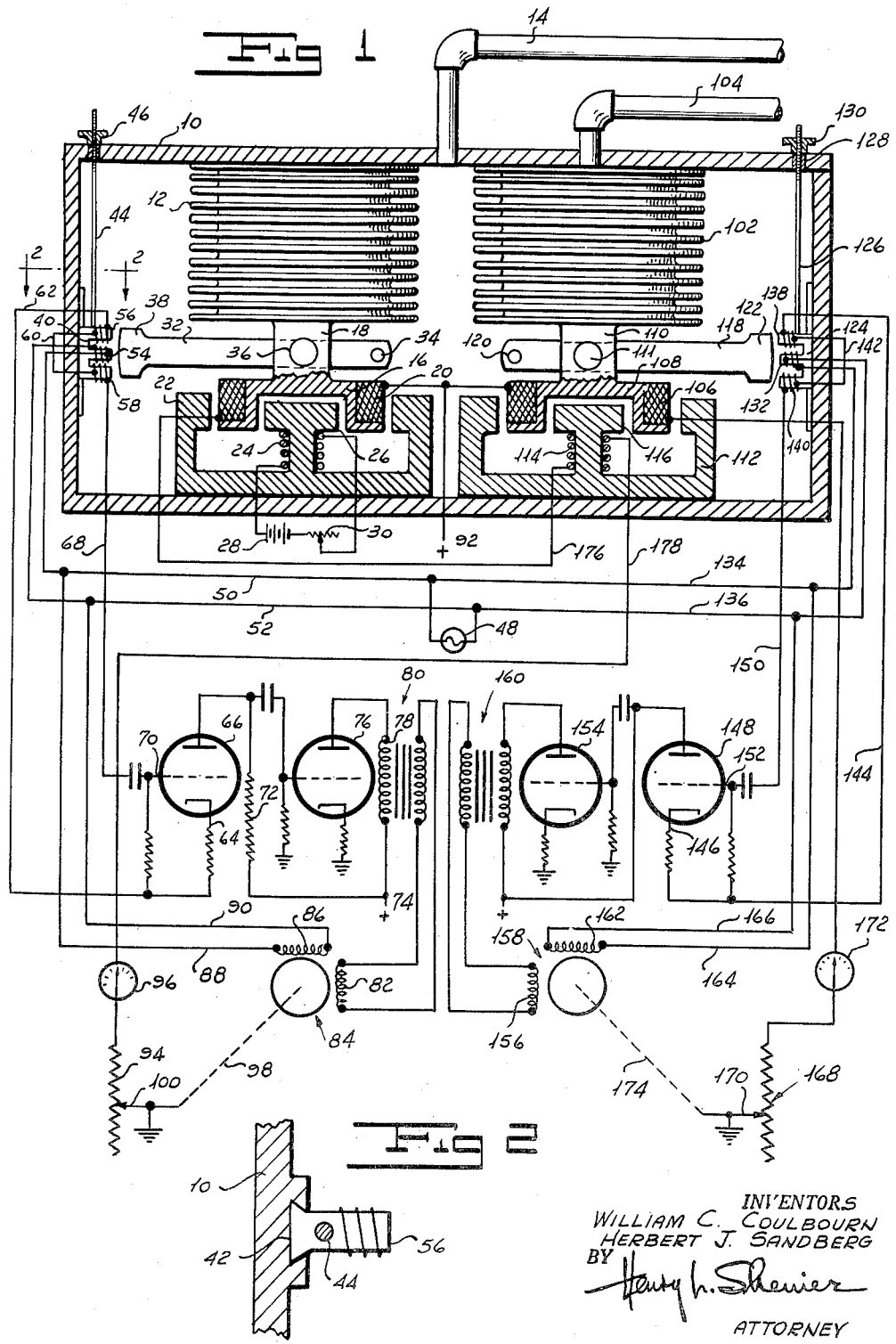
INVENTORS
WILLIAM C. COULBOURN
HERBERT J. SANDBERG
BY Henry L. Shenier
ATTORNEY United States Patent Office 2,694,927
Patented Nov. 23, 1954

2,694,927

MACH NUMBER METER

William C. Coulbourn, Roslyn Heights, and Herbert J. Sandberg, New York, N. Y., assignors to The Norden Laboratories Corporation, White Plains, N. Y., a corporation of Connecticut Application February 6, 1953, Serial No. 335,542

7 Claims. (Cl. 73—182)

Our invention relates to an improved Mach number meter and more particularly to a meter for measuring Mach numbers with great precision and accuracy.

The Mach number is the ratio of local flow velocity of a gas to the local velocity of sound. It is a convenient measure of the air speed of high-speed aircraft. Mach number can be expressed as a function of the ratio of the difference between the Pitot pressure and the static pressure with respect to the static pressure, itself. In order to measure the Mach number by this ratio, some means must be provided for comparing the pressure difference between Pitot pressure and static pressure with the static pressure. In the prior art devices for comparing pressures, a pair of bellows, each of which is responsive to one of the pressures to be compared, is mounted in a housing, and the forces exerted by the pressures on the bellows are compared mechanically, usually by a balancing system in which the forces are balanced against each other by means of a system of levers. Because of the nonlinearity of the bellows and the inaccuracy inherent in all mechanical systems, these prior art devices provide expensive means for comparing pressures which are of limited accuracy. We have conceived the improvement of balancing the forces exerted by these pressures with the electromagnetic pulls of windings disposed in magnetic fields. We have also provided an electromagnetic system wherein the forces exerted by the pressures are compared in such a manner that an extremely accurate measurement of the Mach number is achieved. To overcome the effects due to the nonlinearity of the bellows and the electromagnetic system, we have arranged the sensing elements of our apparatus to operate about nulls. Our sensing elements are arranged so that corrections initiated by the individual sensing elements are fed back to the system, and the tendency of the system to "hunt" caused by the nonlinear characteristic is substantially overcome.

One object of our invention is to provide an improved Mach number meter having high accuracy and precision.

Another object of our invention is to provide a system wherein two pressures may be compared with a high degree of accuracy.

Another object of our invention is to provide an improved Mach number meter in which the static pressure and the difference between Pitot pressure and static pressure are balanced against the electromagnetic pulls of windings disposed in magnetic fields, the arrangement being such that a comparison between the pressures being balanced is obtained.

Another object of our invention is to provide an improved Mach number meter in which the sensing elements are operated about nulls so that great accuracy and precision is obtained.

Other and further objects of our invention will appear from the following description.

In general our invention contemplates the provision of a pair of bellows, one of which is responsive to static pressure and the other of which is responsive to the difference between Pitot pressure and static pressure. These bellows are mounted in a common housing. The forces exerted by the bellows are balanced by the electromagnetic pulls of a pair of windings, each of which is carried by one of the bellows. The windings are disposed in magnetic fields. As the forces exerted on the bellows by the pressures are varied, the currents through the respective coils are varied to balance the pulls. In order to compare the forces, we arrange the system so that the electromagnetic field in which one of the coils is placed results from the current through the other coil. In this way we obtain the desired comparison between static pressure and the difference between Pitot pressure and static pressure. We also arrange the sensing elements of the respective bellows to operate about nulls so that the effect of the nonlinearity, resulting from the bellows or the electromagnetic system or other causes and all of these, is overcome.

In the accompanying drawings which form part of the instant specification and which are to be read in conjunction therewith and in which like reference numerals are used to indicate like parts in the various views:

Figure 1 is a diagrammatic view of a Mach number meter showing one embodiment of our invention.

Figure 2 is a diagrammatic sectional view drawn on an enlarged scale and taken along the line 2—2 of Figure 1.

More particularly, referring now to the drawings, a closed housing 10, which may be of any appropriate shape and formed of any suitable material, has a partially evacuated bellows 12 mounted therein. A pipe 14 leads from the atmosphere to the interior of the housing so that bellows 12 is responsive to static pressure. On the base of the bellows 12 we mount a support 16 of nonmagnetic material, by means of a bracket 18 which carries a winding 20. The winding 20 is disposed in the field of electromagnet 22 which may be a permanent magnet if desired, but which is preferably energized by means of a winding 24 disposed about its central pole 26 and supplied with current from a battery 28 flowing through a variable resistor 30.

We pivotally mount an armature 32 on the chamber wall around pin 34 carried by the housing and attach it to bracket 18 by a pin 36 so that the end 38 of the armature is positioned adjacent a sensing means such as an E-transformer or the like 40. The E-transformer is slidably mounted in a slot 42 formed in the side of housing 10 as shown in Figure 2. To adjust the position of the E-transformer, we provide a shaft or rod 44 rotatably mounted in the E-transformer and extending upwardly through the top of the housing and through appropriate sealing means. The upper end of this shaft is threaded and carries a nut 46 which bears on the top of the housing. The position of the E-transformer may be varied to zero this system by turning nut 46 to slide the transformer up or down in slot 42.

We connect an alternator 48 across conductors 50 and 52 to provide excitation for the central pole winding 54 of E-transformer 40. The upper and lower pole windings 56 and 58 of the E-transformer are oppositely wound and connected in series by conductor 60. Since these windings are oppositely wound, they will produce voltages which are 180 degrees out of phase with each other and which will be added by series connection 60. The resultant difference between the voltages induced in windings 56 and 58 appears between a conductor 62 connected to the cathode 64 of a thermionic tube 66 and a conductor 68 connected to the grid 70 of tube 66. That is, we impress the resultant difference between the voltages induced in the upper and lower windings of E-transformer 40 on the grid of an amplifier tube 66. The plate of tube 66 is connected through a resistor 72 to a source of positive potential 74. The output of tube 66 is impressed on the grid of a second amplifier tube 76, the plate of which is also connected to the source 74 through the primary winding 78 of a transformer indicated generally at 80. The output of amplifier 76 is impressed across this primary winding 78 and the output of transformer 80 is applied to the winding 82 of a two-phase motor indicated generally at 84. The other winding 86 of the two-phase motor 84 is energized by alternator 48 through conductors 88 and 90. We choose the parameters of the circuit between conductors 62 and 68 and winding 82 such that the voltage across winding 82 is ninety degrees out of phase with the voltage across conductors 62 and 68.

The current through winding 20 on support 16 is supplied from a direct current source, the positive terminal of which is indicated at 92. The circuit of coil 20 includes a resistor 94 and an indicator 96. An appropriate mechanical linkage 98 drives a brush 100 on resistor 94 from two-phase motor 84.

In operation, the static pressure exerts a force on bellows 12 which is transmitted through the bracket 18 to support 16. This force is resisted by the electromagnetic pull of winding 20. The position of brush 100 on resistor 94 determines the current through winding 20 and thus its pull if we maintain the field of the magnet 22 constant. When the electromagnetic pull exactly equals the force exerted by static pressure on bellows 12, this portion of our system is balanced and armature 32 is in its mid position so that its end 38 is symmetrically disposed with respect to the center pole winding 54 of E-transformer 40. When armature 32 and its end 38 are so disposed, equal and opposite voltages are induced in windings 56 and 58. These voltages will cancel each other so that no signal appears on the grid of tube 66 and hence no voltage appears across winding 82 of two-phase motor 84. Therefore, the motor will not rotate to displace brush 100, and indicator 96, calibrated in appropriate units, will read the correct static pressure or pressure altitude. When the static pressure changes, however, the voltage induced in one of the windings 56 or 58 is greater than that induced in the other of the two windings, and the difference voltage is impressed on the grid of tube 66, amplified by tubes 66 and 76 and impressed on winding 82 of motor 84 by means of transformer 80. Depending on whether armature 32 moves up or down, the armature of motor 84 rotates in one direction or the other so as to move brush 100 in a direction to vary the resistance of resistor 94 and thus the current through coil 20 to compensate for the change in pressure.

It should be noted particularly that we have arranged our system to overcome the effect of nonlinearity in the magnetic circuits and the bellows. When a correction is initiated by the displacement of the armature 32, to return the system to balance our construction readjusts the coil current so that the proper pull is exerted by the coil. Since the correction immediately affects the position of support 16, it also affects the position of armature 32 which is connected to the support and the resultant signal from E-transformer 40. That is, the correction initiated by the sensing element is immediately fed back into the system so as to affect the signal produced by the sensing element itself. Thus, if the displacement of the armature due to a change in static pressure is too large, the fact that it is too large will immediately be felt by the sensing element. Since armature 32 is responsive to its own correction, it is returned to the null rapidly and the correction is rapidly reduced asymptotically so that the sensing element will not overrun the null. If the correction is too small, the return of the element to the null will be delayed until the proper current value has been attained.

We mount a second bellows 102 within the housing adjacent bellows 12. A pipe 104 connects the interior of this bellows to a source of Pitot dynamic pressure, such as a Pitot tube (not shown), so that bellows 102 is responsive to the difference between static pressure (the pressure within the housing) and Pitot dynamic pressure. We balance the force exerted by this difference with the electromagnetic pull of a winding 106 on a nonmagnetic support 108 depending from a bracket 110 on bellows 102. We place winding 106 in the field of an electromagnet 112 which is excited by the current passing through a coil 114 surrounding its central pole 116. It is to be noted that coil 20 and winding 114 are in series so that the current flowing through coil 20 also flows through coil 114. Stated differently, the field of magnet 112 is a function of the current through coil 20 and hence a function of static pressure. The remainder of the arrangement for measuring the difference between Pitot pressure and static pressure is similar to that we have described in connection with bellows 12. That is, we pivotally mount an armature 118 on housing 10 at pivot pin 120 so that its end 122 is adjacent a sensing element such as an E-transformer or the like 124. The armature is connected to bracket 110 by a pin 111. E-transformer 124 is mounted in a slot on housing 10 and has a shaft 126 rotatably mounted therein. The top of shaft 126 is threaded and extends through insulating means 128 in the housing and has a nut 130 rotatably mounted thereon. By turning nut 130, we can slide E-transformer 124 up or down to zero this pressure measuring means. We energize central pole winding 132 of E-transformer 124 from alternator 48 by means of leads 134 and 136. The upper and lower leg windings 138 and 140 of the E-transformer are oppositely wound and series connected by a conductor 142. Winding 138 is connected by a conductor 144 to the cathode 146 of a thermionic tube 148 and winding 140 is connected by a lead 150 to the grid 152 of tube 148. Since windings 138 and 140 are oppositely wound, the voltages induced in them are 180 degrees out of phase and are serially added by connection 142. Any difference in the induced voltages is impressed on the grid 152 of tube 148, and the output of tube 148 is amplified by amplifier tube 154. The output of tube 154 in turn is applied to a winding 156 of a two-phase motor indicated generally at 158 through the medium of a transformer indicated generally at 160. The other winding 162 of motor 158 is connected across alternator 48 by leads 164 and 166. As in the case of the system measuring static pressure, we choose the parameters of the circuit between conductors 144 and 150 and winding 156 such that the voltage across winding 156 is ninety degrees out of phase with the voltage across conductors 144 and 150.

The current to winding 106 is supplied from a direct current source, the positive terminal of which is indicated at 92. We also include in this circuit a variable resistor 168 having a brush 170 and a meter 172). The armature of motor 158 drives the brush 170 through an appropriate mechanical linkage 174 to adjust the resistance of resistor 168 and thus the current through coil 106.

In operation, when armature 118 is in the null position, motor 158 is not rotated and the current through coil 106 causes an electromagnetic pull which equals the force exerted on bellows 102 by the difference between Pitot pressure and static pressure.

We connect winding 114 on pole 116 in series with the coil 20 of the static pressure system by means of conductors 176 and 178 so that the current passing through coil 114 is the current required to balance the force exerted on bellows 12 by static pressure. This current is a measure of static pressure, and in our arrangement the electromagnetic field of this current interacts with the electromagnetic field caused by the current through coil 106 in such a way that the current through coil 106 is a function of the ratio of the difference between Pitot pressure and static pressure and the static pressure and thus a measure of the Mach number.

It should be noted that we have arranged sensing element 124 to operate about a null similarly to element 40 so that the effects due to nonlinearity of bellows 102 and the magnetic circuit associated therewith are overcome. That is, we have arranged the armature to initiate a correction which is fed back into the system to prevent "hunting" of armature 118 and providing accurate indication of the difference between Pitot pressure and static pressure.

Let:

$P_S$ = static pressure
$P_V$ = Pitot pressure
$A_S$ = the effective area of bellows 12
$A_P$ = the effective area of bellows 102
$I_1$ = the current through coils 20 and 114
$I_2$ = the current through coil 106
$N_A$ = the number of turns in coil 20
$N_B$ = the number of turns in coil 106
$N_C$ = the number of turns in coil 114

In operation, the force exerted by bellows 102 is the difference between Pitot pressure and static pressure multiplied by the area of bellows 102. When sensing element 124 is in the null position, the force exerted by bellows 102 is balanced by a force $I_1 N_C \cdot I_2 N_B$. Therefore, at balance:

(1) $$I_1 N_C \cdot I_2 N_B = (P_V - P_S) A_P$$

or (2) $$I_2 = \frac{A_P}{N_C N_B} \cdot \frac{P_V - P_S}{I_1}$$

The force exerted by the static pressure on bellows 12 will be $P_sA_s$, and this force will be balanced by a force $N_AI_1$ so that (3) $$N_AI_1 = P_sA_s$$

or (4) $$I_1 = \frac{P_sA_s}{N_A}$$

Substituting in Equation 2 for $I_1$, we obtain the following relation:

(5) $$I_2 = \frac{N_AA_P}{N_CN_BA_S} \cdot \frac{P_V - P_S}{P_S} = K\frac{P_V - P_S}{P_S}$$

(6) $$\text{Mach's number} = f\left(\frac{P_V - P_S}{P_S}\right)$$

Since $I_2$ is a function of the ratio of the difference between Pitot pressure and static pressure and static pressure itself, and Mach's number is a function of the same ratio, $I_2$ is a measure of Mach's number. Meter 172, through which current $I_2$ passes, therefore, can be calibrated in Mach numbers.

It will be seen that we have accomplished the objects of our invention in providing an extremely accurate system for measuring Mach numbers wherein the forces exerted by the pressures to be compared are balanced against the electromagnetic pulls of windings disposed in magnetic fields. We also provide an arrangement for comparing these pressures in such a manner that an accurate indication of Mach number is obtained. The arrangement is such that the sensing elements of the systems for measuring static pressure and the difference between Pitot pressure and static pressure operate about nulls. The compensations initiated are fed back into the system in such a manner as to prevent "hunting" and thus eliminate the effects due to nonlinearity of the bellows and magnetic circuits. In addition, we have provided an apparatus which will simultaneously give accurate indications of both altitude and Mach number.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A meter for measuring Mach numbers comprising in combination a housing, means providing communication between said housing and the surrounding atmosphere, a partially evacuated first bellows and a second closed bellows mounted in said housing, means providing communication between the interior of said second bellows and Pitot pressure, first and second windings carried respectively by said first and second bellows, a magnet mounted on said housing, said first winding being disposed in the field of said magnet, an electromagnet having a winding and mounted on said housing, the winding of the electromagnet being connected in series with said first winding, said second winding being disposed in the field of said electromagnet, first and second armatures pivotally mounted on said housing and connected respectively with said first and second windings for movement therewith, sensing means mounted on the housing adjacent each of said armatures so as to be influenced thereby, first and second variable means for supplying energizing currents to said first and second windings, means responsive to the displacement of each of said armatures relative to its associated sensing means to vary respective variable means to change the currents through respective first and second windings and means for measuring the current through said second winding as the desired measure of Mach number.

2. A meter for measuring Mach numbers as in claim 1 wherein said sensing means include E-transformers having center windings and means for energizing the center windings.

3. A meter for measuring Mach numbers as in claim 1 wherein said means responsive to the displacement of the armatures includes amplifying channels.

4. A meter for measuring Mach numbers as in claim 1 wherein said variable means are variable resistors.

5. A meter for measuring Mach numbers as in claim 1 wherein said means responsive to the displacement of said armatures includes means for producing signals agreeable to the direction of displacement of the armatures, and first and second reversible motors responsive to said signals for varying said first and second variable means.

6. A meter for measuring Mach numbers as in claim 1 wherein said sensing means includes E-transformers having center windings, means for exciting the center windings and means for varying the relative positions of said E-transformers while maintaining the pressure within the housing and the second of said bellows at predetermined points.

7. A meter for measuring Mach numbers as in claim 1 wherein said magnet is a second electromagnet and means for adjusting the magnetic field of said second electromagnet.

References Cited in the file of this patent

UNITED STATES PATENTS

| Number | Name | Date |
|---|---|---|
| 2,574,656 | Peterson | Nov. 13, 1951 |
| 2,599,288 | Schaeffer | June 3, 1952 |

FOREIGN PATENTS

| Number | Country | Date |
|---|---|---|
| 1,012,540 | France | Apr. 16, 1952 |